UNITED STATES PATENT OFFICE.

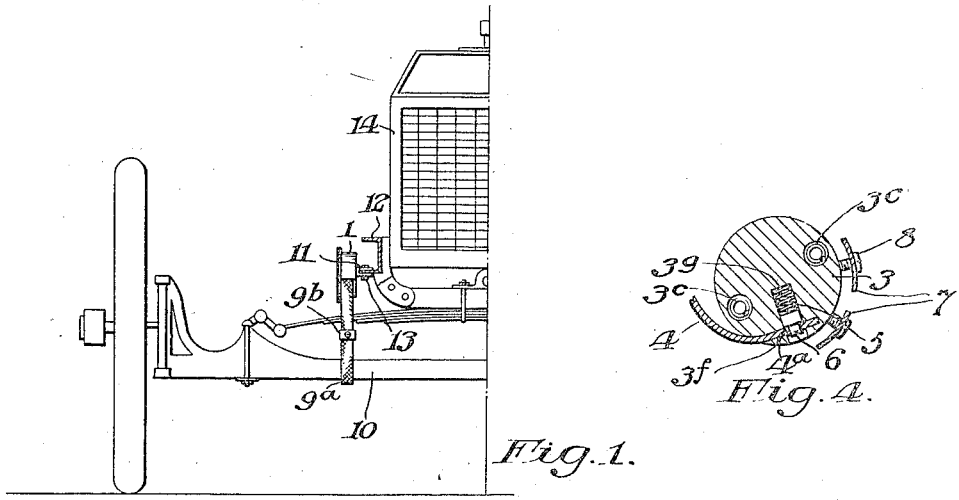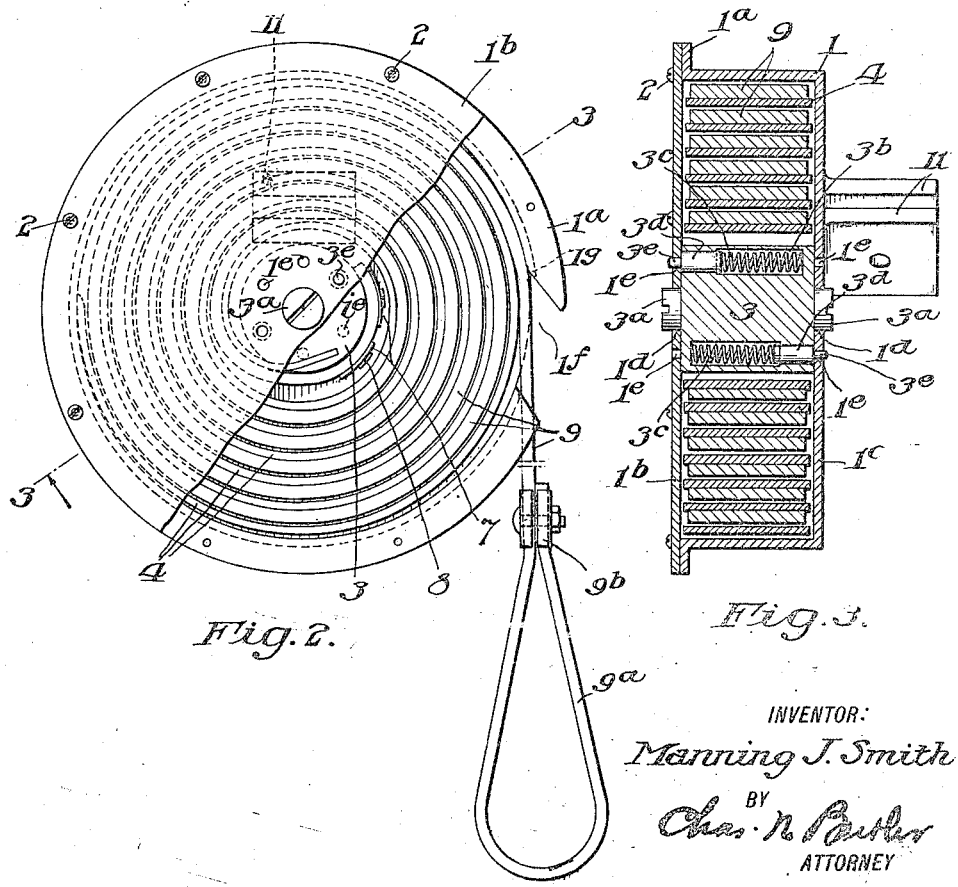

MANNING J. SMITH, OF PHILADELPHIA, PENNSYLVANIA.

SHOCK-ABSORBER.

1,175,385.
Specification of Letters Patent.
Patented Mar. 14, 1916.

Application filed August 7, 1915. Serial No. 44,144.

*To all whom it may concern:*

Be it known that I, MANNING J. SMITH, a citizen of the United States, residing in the city of Philadelphia, county of Philadelphia, and State of Pennsylvania, have invented certain Improvements in Shock-Absorbers, of which the following is a specification.

My invention is an improved shock absorber designed for use on motor vehicles, but adapted for general use.

The improvements, in their preferred form, are embodied in a case or drum adapted to be fastened to a vehicle frame, a spiral spring having its inner end fixed to an anchor at the center of the case and its outer end engaging frictionally with the cylindrical wall of the case, and a strap having its inner end fixed to the anchor and its outer end connected to the vehicle axle with a spirally wound intermediate section having coils alternating with the coils of the spring, the anchor having means for engaging it in adjustable relation to the case and the latter having means for controlling the retraction of the band with prevention of the reverse shock by the expansion of the spring after contraction by a shock.

My primary object is to provide a simple and inexpensive shock absorber of improved efficiency.

In the accompanying drawings, Figure 1 is a front elevation of a section of a motor vehicle equipped with my invention; Fig. 2 is a broken side elevation showing on an enlarged scale the detached shock absorber shown attached in Fig. 1; Fig. 3 is a sectional view taken on the line 3—3 of Fig. 2; and Fig. 4 is a transverse sectional view of the detached anchor.

The mechanism, as illustrated in the drawings, comprises the case or drum 1 having the peripheral flange 1$^a$ and the detachable face plate 1$^b$ fixed thereto by screws or bolts 2, the case's parallel plates or faces 1$^b$ and 1$^c$ containing the central circular bearings 1$^d$ and the concentrically disposed circular bearings 1$^e$.

An anchor 3, in the form of a cylinder, has end journals 3$^a$ engaged in the bearings 1$^d$ and sockets 3$^b$ containing coiled springs 3$^c$ together with plungers 3$^d$ having end studs 3$^e$ adapted to enter the holes 1$^e$, the springs pressing the plungers forward and holding the studs in the holes to prevent the anchor turning in the case. The anchor 3 is provided with a slot 3$^f$ for the reception of the inner end of a spirally coiled spring 4 and with a radial socket 3$^g$ for the reception of a coiled spring 5, together with a stud 6, adapted to be pressed in against the action of the spring 5 to permit the insertion of the end of the spring 4 and to be pressed out by the spring 5 to engage in the aperture 4$^a$ of the spring 4. The anchor 3 is also provided with the clamps 7 and the screws 8 for holding the inner end of the band 9.

The spring 4 and band 9 are wound in laminated alternating coils on the anchor 3 within the case 1. The band 9 extends through the aperture 1$^f$ of the case, the outer end thereof being provided with the loop 9$^a$ extending around the automobile axle 10 and the loop being adjustable by the clamp 9$^b$. The case 1 has brackets 11 fixed to the plate 1$^c$ and secured to the frame member 12 by a bolt 13. It will be understood that by thrusting in the studs 3$^d$ so that their ends 3$^e$ clear the plates 1$^b$ and 1$^c$ and applying a tool to the slotted journals 3$^a$, the anchor 3 can be turned and the coils of the spring 4 and band 9 wound up or released to effect such adjustment as may be desired.

In operation, the shock otherwise resulting from the undesired separation of the axle 10 and frame 12, as by the violent upward movement of the body 14, is prevented and the force gradually absorbed by the action of the band 9 on the spring 4 whose coils are wound up and tightened by the tension on the band. The reverse movement is regulated and shock prevented by the frictional action between the periphery of the case and the band, for it will be understood that the tendency of the spring to expand causes its outer coil to press the section of the band exterior thereto against the interior surface of the periphery of the case. The action which takes place here avoids the shock which commonly takes place with the usual free expansion of coiled springs employed for absorbing shock.

Having described my invention, I claim:

1. In a shock absorber, a case having a frictional surface, an anchor supported within said case, a coiled spring in said case with its inner end fixed to said anchor and its outer end movable relatively to said surface, and a band having a coiled section within said case in laminated relation and movable relatively to said spring, the inner end of said band being connected to said anchor and said spring pressing said band into frictional engagement with said surface.

2. In a shock absorber, a case having parallel faces and a circular periphery containing an aperture, an anchor journaled in said faces, one or more spring pressed studs movable in said anchor for engaging it in position in said case, a coiled spring in said case having its outer end free and its inner end fixed to said anchor, and a band extending through said aperture to a connection with said anchor and having coils between said aperture and anchor alternating with the coils of said spring.

3. The combination with a vehicle axle and frame, of a case fixed to said frame, a spirally coiled spring having its inner end anchored in said case and its outer end freely movable therein, and a band having a spirally coiled section laminated with the coils of said spring in said case, the inner end of said coiled section being anchored in said case and the outer end connected with said axle, said spring being adapted for pressing said band against said case.

4. In a shock absorber, a case having a curved periphery, a coiled spring having its inner end fixed in said case and its outer end free, and a band having its inner end fixed in said case, said band having coils alternating with the coils of said spring and said spring being adapted for pressing said band against the periphery of said case.

In testimony whereof, I have hereunto set my name this second day of August, 1915.

MANNING J. SMITH.